(12) United States Patent
Popovich et al.

(10) Patent No.: US 6,353,489 B1
(45) Date of Patent: Mar. 5, 2002

(54) OPTICAL RETRO-REFLECTION DEVICE

(75) Inventors: Milan M. Popovich, Leicester; Antoine Yvon Messiou, Systeom, both of (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/722,072

(22) Filed: Nov. 24, 2000

Related U.S. Application Data

(60) Provisional application No. 60/166,963, filed on Nov. 23, 2000.

(51) Int. Cl.$^7$ ................................................. G02B 5/32
(52) U.S. Cl. .............................. 359/15; 359/7; 359/22; 359/530
(58) Field of Search .......................... 359/3, 7, 15, 22, 359/529, 530

(56) References Cited

U.S. PATENT DOCUMENTS

| | | | | |
|---|---|---|---|---|
| 3,833,893 A | * | 9/1974 | Rajchman | 359/529 |
| 5,180,910 A | * | 1/1993 | Spratte et al. | 250/221 |
| 5,822,119 A | * | 10/1998 | Rasmussen et al. | 359/530 |

* cited by examiner

Primary Examiner—Darren Schuberg

(74) Attorney, Agent, or Firm—Skjerven Morrill MacPherson LLP

(57) ABSTRACT

An optical retro-reflective apparatus for application to reconfigurable displays for highway signs and other applications is disclosed. In a first preferred embodiment, the apparatus includes a retro-reflector such as a corner cube prism, three orthogonally arranged planer reflectors, or a plurality of either arranged as an array, or an array of micro-spheres or micro-prisms arranged as a corner-cube. In one embodiment, a holographic diffraction element is placed between a source of radiation such as visible light and one or more of the retro-reflectors. The diffraction element is made up of one or more stacked holographic devices in which pre-determined holographs are stored, operative to diffract a particular wavelength band of radiation (e.g. red, blue and green visible light). The hologram devices can be stacked and selectively deactivated so that the desired wavelength band (or color) to be diffracted is selected. In this way, the retro-reflective apparatus can be made to reflect or re-transmit light of a certain color. In a second embodiment, the retro-reflectors are arranged orthogonally and include the diffraction elements. The diffraction elements for each retro-reflector are programmed to diffract (and therefore reflect) a different wavelength band of light. Thus, only the retro-reflector that is in an active state will reflect (by diffraction) a portion of the incident radiation, and that portion is preferably red, green or blue visible light.

23 Claims, 4 Drawing Sheets

OPTICAL RETRO-REFLECTION DEVICE

This is application claims the benefit of provisional application No. 60/166,963, filed Nov. 23, 2000.

BACKGROUND OF THE INVENTION

1. Field of the Invention

The present invention relates to an optical retro-reflection device, and more articularly to an optical retro-reflection device employing switchable holographic diffraction devices.

2. Description of the Related Art

Retro-reflective devices and materials are those that reflect and re-emit light incident on such devices and in a direction that is parallel to that of the source of the incident light. Put another way, such materials and devices reflect light directly back to the source of the light they are reflecting or re-emitting. Such materials and devices are widely used in the areas of nighttime transportation and safety. They are used to identify highway lanes and signs using the light emitted from vehicle headlights for example.

It would be advantageous to programmably control the color of the light that is reflected or re-emitted by such devices and materials for numerous applications. For example, it would be beneficial to control the color of light reflected by retro-reflector arrays that form a reconfigurable display for a highway warning or informational sign.

SUMMARY OF THE INVENTION

According to the present invention, there is disclosed an optical retro-reflection device comprising a retro-reflector which is disposed to receive light incident upon the device and to reflect and re-emit the light from the device in a direction parallel to its direction of incidence. A plurality of holographic diffraction devices are disposed to act upon the incident light between the source of the light and its being incident upon and being re-emitted by the optical retro-reflection device. Each of the holographic diffraction devices are operative to act upon a different wavelength band of radiation (e.g. red, green or blue visible light) and are switchable between an active, diffracting state and an inactive, non-diffracting state. A control circuit coupled to the holographic diffraction devices is operative to selectively switch the holographic diffraction devices between their active and inactive states.

The retro-reflector can be a single cube corner prism or three orthogonally arranged plane reflectors. Alternatively, the retro-reflector can be an array of such prisms or reflectors. In the case where the retro-reflector is an array of such devices, the optical retro-rereflection device can include a set of holographic diffraction devices each associated with one of the individual prisms/reflectors making up the array, or the diffraction devices can each be associated with a group of the prisms/reflectors. As a further alternative, the retro-reflector can be an array of Microspheres, or an array of micro-prisms each of which is in the form of a cube corner. Again, a single diffraction device can be associated with the entire array, or a number of diffraction devices may be associated each with a portion off the array.

In a preferred embodiment, the holographic diffraction devices are each composed of a transmission hologram and are disposed optically in front of the retro reflector with respect to the direction of incidence of the light. The transmission holograms preferably operate in an additive mode.

In an alternate preferred embodiment, the holographic diffraction devices are each composed of a reflection hologram, and the retro-reflector is configured as three orthogonally-arranged reflection devices each of which is composed of a filter and one of the holographic diffraction devices. The filter of each reflection device is disposed optically in front of its associated holographic diffraction device, and is operative to transmit radiation of a wavelength band which corresponds to that intended to be acted upon by that holographic diffraction device. The filter of each reflection device is an interference filter, preferably a dichroic filter. A light absorbing element is disposed on the surface of the holographic diffraction elements opposite to the surface that is coupled to the filter.

At least one of the reflection devices can deviate from the orthogonal with respect to the other two reflection devices, when further composed of an optical device that is operative to compensate for this deviation. This compensating optical device can be a Fresnel lens or a Fresnel prism, in which case it is preferable that such lens or prism be optically interposed between the respective filter and the respective holographic diffraction device.

BRIEF DESCRIPTION OF THE DRAWINGS

The present invention may be better understood, and its numerous objectives, features and advantages made apparent to those skilled in the art by referencing the accompanying drawings. The use of the same reference number throughout the several figures designates a like or similar element.

Figure 1:
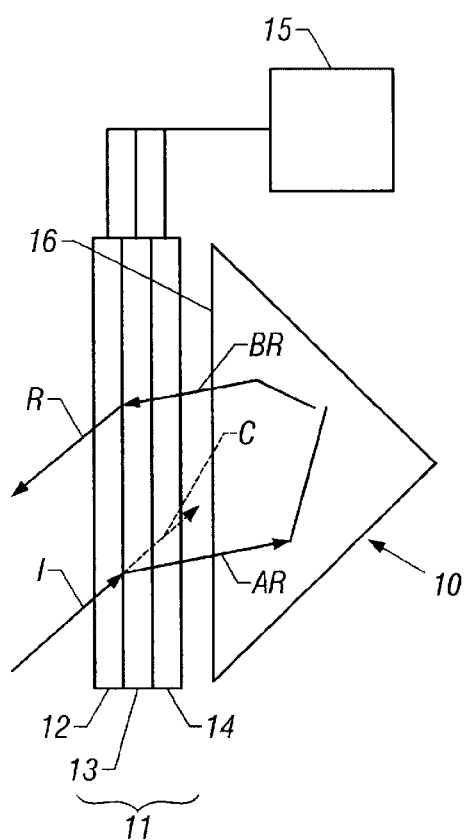
FIG. 1 is schematic side view of a first embodiment of an optical retro-reflection device according to the present invention, wherein the retro-reflector is a single cube corner prism or three orthogonally arranged plane reflectors.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims.

DETAILED DESCRIPTION

With reference to FIGS. 1–8, a detailed description of the present invention is presented. As a matter of introduction, all of the embodiments of the optical retro-reflective device of the present invention employ one or more holographic diffraction elements. These devices can be switched from an active state in which they selectively diffract light of a pre-determined band of wavelengths incident upon their surfaces, to an inactive state during which they pass the incident light with no diffractive effect on the light passing through them.

In each of the embodiments disclosed, these holographic diffraction devices are essentially holograms that have been pre-recorded into a medium. The recording medium is typically a polymer-dispersed liquid crystal mixture which undergoes phase separation during the hologram recording process, creating fringes comprising regions densely populated by liquid crystal micro-droplets interspersed with regions of clear polymer. These can be thin phase holograms (that is holograms which conform to the Raman Nath regime) or they can be volume holograms, also known as thick or Bragg holograms. Use of the latter is preferred, because they offer high diffraction efficiencies for incident beams whose wavelengths are close to the theoretical wavelength satisfying the Bragg diffraction condition, and which are within a few degrees of the theoretical angle which also satisfies the Bragg diffraction condition.

When an electric field is applied to the hologram by way of electrodes, the natural orientation of the liquid crystal droplets is changed, causing the refractive index modulation of the fringes to reduce and the hologram diffraction efficiency to drop to a very low level. This effectively erases the hologram for as long as the electric field is maintained. In this state, the inactive state of the device, the light incident on the surface of the device passes through the device with virtually no diffraction of the light. Once the electric field is removed, the hologram re-establishes itself. It is possible to achieve very fast switching rates for these devices, typically with a switching time of less than 150 microseconds, and perhaps as low as a few microseconds.

For the embodiments of FIGS. 1–4, the holographic diffraction devices 12, 13 and 14 are essentially composed of transmissive-type holographic devices operating in the additive mode. In these devices, the holograms are created to selectively diffract a certain pre-established wavelength band of interest. Thus, when light is incident on one surface of the device, the diffracted component (i.e. the pre-determined wavelength of interest) is transmitted through the device but exits at a certain angle of diffraction from the surface opposite to the surface of incidence. The remaining wavelength bands of the incident light are transmitted through the device and exit the other side with no angle of diffraction. If the diffracted light component is used in some way apart from the other components, the operation of the device is that of an optical band-pass filter.

In the embodiments of FIGS. 1–4, these holographic devices have been stacked with each of the devices programmed to diffract a different wavelength band of radiation, such as red, green and blue visible light. Thus, the devices can be programmed via their holograms to diffract for example, red, blue and green light respectively. If only one is active, then only one wavelength is diffracted and the remaining light components pass straight through the stack. If more than one of the devices is active at a time, then a combination of light will be diffracted.

Transmissive devices can also be manufactured to operate in a subtractive mode as well, in which case the active device will diffract all components of incident light except for the wavelength band of interest.

For the embodiments of FIGS. 5–8, reflective-type holographic diffractive devices are employed. For these devices, while in the active state they diffract the wavelength band for which they are programmed by reflecting the diffracted light component from the same surface upon which the source light is incident, while passing the remaining components through and out the opposite surface.

One significant difference between reflective and transmissive-type holographic devices (other than the surface through which the diffracted light emanates) is that transmissive-type devices are sensitive to the polarization state of the light incident thereon, whereas reflective-type devices are insensitive to polarization. More particularly, the diffraction efficiency for p-polarized light is significantly greater than that for s-polarized light in transmissive-type devices. As a result, the s-polarized component of the light tends to pass through the holographic diffraction devices unaffected and is therefore lost from the system. This loss gives rise to a loss of intensity of the diffracted light. This less than optimal operation can be overcome by employing techniques such as converting the s-polarized light to p-polarized light and passing it through a second stack of holographic devices.

For more information regarding the manufacturing of such holographic devices, techniques for overcoming the loss of s-polarized light in transmissive-type devices, and ways to improve operation of such devices such as by increasing the effective angular bandwidth of the holographic diffraction devices (i.e. the range of incidence angles around that which exactly satisfies the Bragg condition) by designing the relevant holograms so that they have curved phase functions, please see pending U.S. patent application Ser. No. 09/478,150 filed Jan. 5, 2000 and entitled "Optical Filter Employing Holographic Optical Elements and Imaging System Incorporating the Optical Filter," which is incorporated herein in its entirety by this reference.

Referring first to FIG. 1, a first preferred embodiment of an optical retro-reflection device is illustrated that is operative to receive (as indicated by arrow I) light incident from a white light source (not shown) and to reflect and re-emit that light in a direction parallel to its direction of incidence, as indicated by arrow R. The device comprises generally a retro-reflector 10, preferably in the form of a cube corner prism, and a stack 11 of holographic diffraction devices disposed optically in front of the retro-reflector with respect to the direction of incidence of the white light.

In the illustrated arrangement, the stack 11 is composed of three switchable holographic diffraction devices 12, 13 and 14 which are designed to act respectively upon red, green and blue wavelength bands in the visible spectrum. Each of the holographic diffraction devices 12, 13 and 14 essentially comprises a transmissive-type hologram that is switchable, by means of a pair of electrodes (not shown), between an active, diffracting state and an inactive, non-diffracting state. In its active state, each of these devices is operative to diffract light falling within its appropriate wavelength band. However, when an electric field is applied to the hologram by means of the aforementioned electrodes, the fringes of the hologram are effectively erased so that the holographic diffraction device has no material effect on the light passing there through.

The optical retro-reflection device also comprises a control circuit 15 that controls switching of the holographic diffraction devices 12, 13 and 14 between their active and inactive states. More particularly, the control circuit 15 operates such that, when any one of the devices 12,13 and 14 is activated, the other two devices are de-activated. Thus, when the device 12 is activated by the control circuit 15, it diffracts red wavelengths from the incident white light towards a front aperture 16 of the retro-reflector 10 (as indicated by arrow $A_R$). The direction in which this red light is diffracted is such that it satisfies the geometrical conditions requisite for retro-reflection by retro-reflector 10 to occur. As a consequence, the red light is retro-reflected by the retro-reflector 10 in a direction (as indicated by arrow $B_R$) that is parallel to the direction of arrow $A_R$. The reflected red light then impinges back upon the stack 11 of holographic diffraction devices from behind and, because the device 12 has the same effect on red light propagating through it in either direction, the red light is diffracted again causing it to emerge in the direction of arrow R parallel to the original direction of incidence of the white light as indicated by arrow I.

In contrast, green and blue wavelengths from the incident white light are not affected by the device 12 and, because the devices 13 and 14 are de-activated at this time, they pass straight through the stack 11 and impinge upon the front aperture 16 of the retro-reflector 10 in a direction (indicated by arrow C) that does not satisfy the requisite geometric conditions for retro-reflection. (This is also the case for zero order diffracted red light). As a consequence, the green and blue wavelengths are lost to the system, and in particular do not emerge from the overall device in the direction of arrow R. It will thus be apparent that in the above-described mode of operation, only red wavelengths are retro-reflected by the overall device. In an analogous manner, only green wavelengths are retro-reflected when the device 13 is activated (while 12 and 14 remain inactive), and only blue wavelengths are retro-reflected when the device 14 is activated (and 12 and 13 remain inactive).

Figure 2:
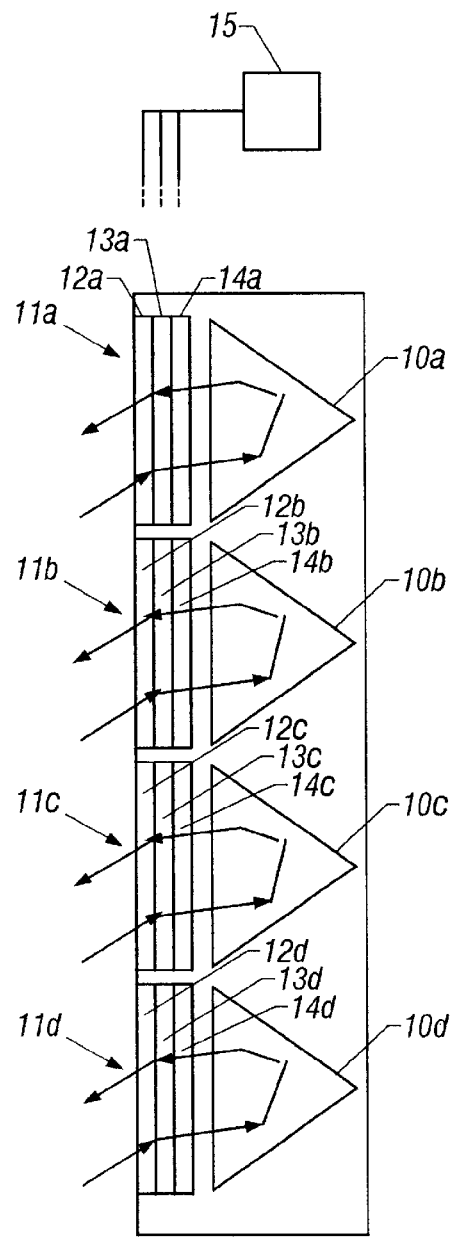
FIG. 2 is schematic side view of a second embodiment of an optical retro-reflection device according to the present invention, where the retro-reflector is an array of cube corner prisms or three orthogonally arranged plane reflectors.

FIG. 2 shows a second embodiment of the optical retro-reflection device, which operates in exactly the same manner as the embodiment of FIG. 1, but which comprises an array of retro-reflectors 10a–d, each of which has its own stack 11a–d of holographic diffraction devices. Preferably, operation of these diffraction devices is controlled by the control circuit 15 such that all of the "red" devices 12a–d, are activated together, all of the "green" devices 13a–d are activated together, and all of the "blue" devices 14a–d are activated together. Thus, at any given time, the overall device retro-reflects only red, green or blue wavelengths. In an alternate arrangement, however, the control circuit 15 activates the holographic diffraction devices in different combinations, so that different parts of the overall device respectively retro-reflect red, green and blue wavelengths at any given time. Such an arrangement would find a particular benefit when applied to reconfigurable displays, such as road information signs. As a further alternative, each of the stacks of holographic diffraction devices can overlay a respective group of the retro-reflectors 10a–d.

In the foregoing embodiments, instead of a cube corner prism or an array of such prisms, the retro-reflector 10 can also be an element composed of three orthogonally arranged plane reflectors, or an array of such elements.

Figure 3:
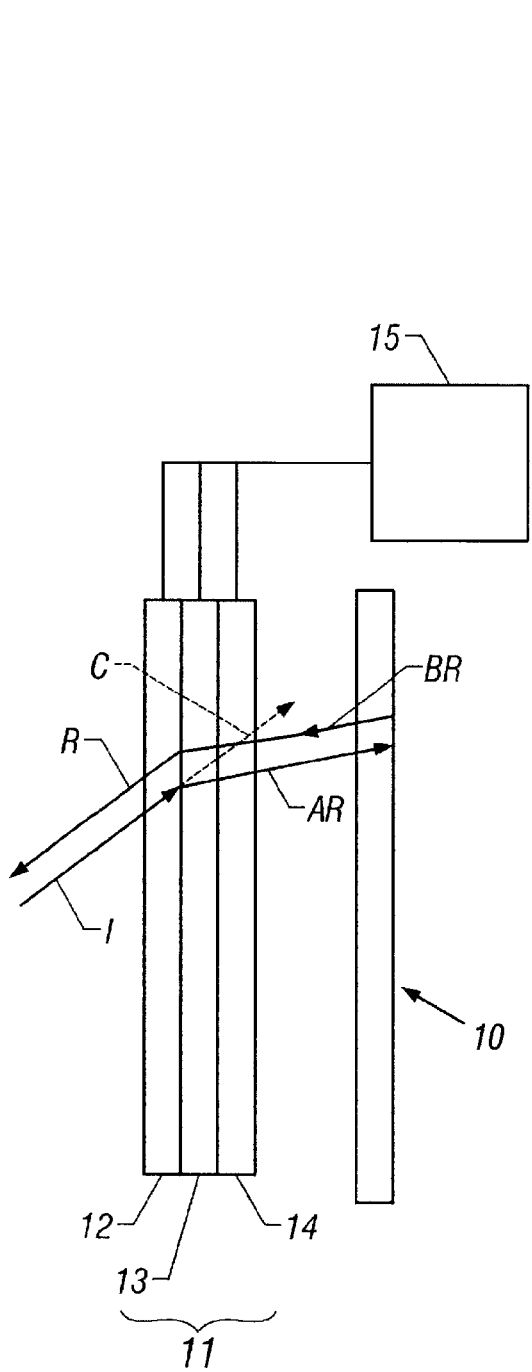
FIG. 3 is a schematic side view of a second embodiment of an optical retro-reflection device according to the present invention, where the retro-reflector is an array of Microspheres, or an array of micro-prisms each of which is in the form of a cube corner.
Figure 4:
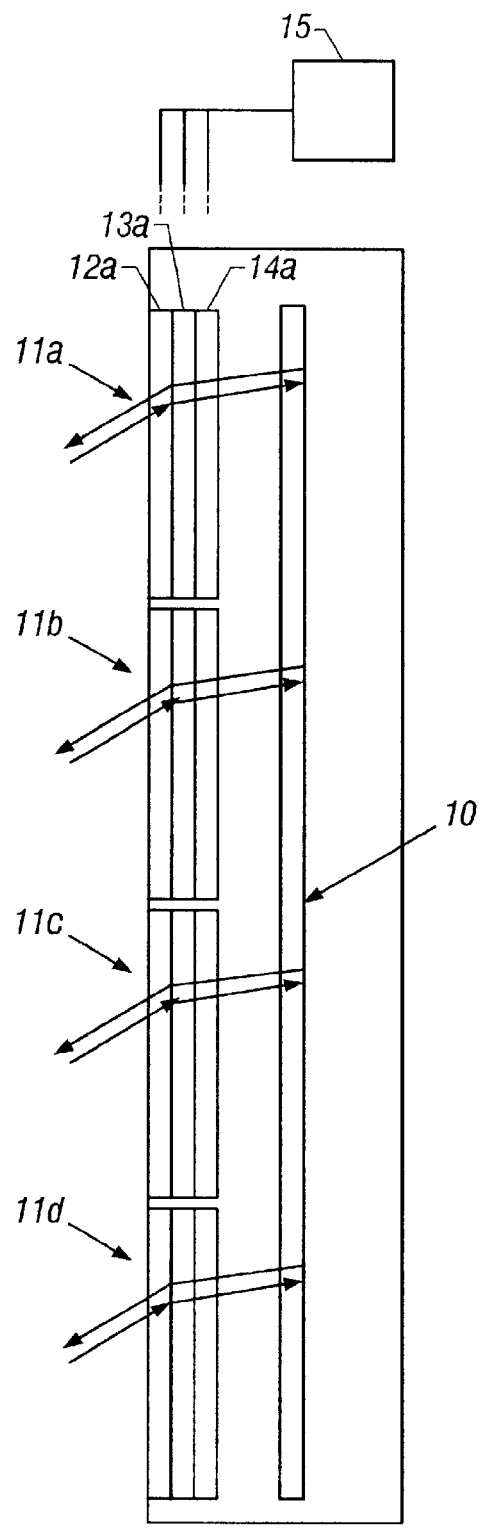
FIG. 4 is a schematic side view of a second embodiment of an optical retro-reflection device according to the present invention, where the retro-reflector is an array of Microspheres, or an array of micro-prisms each of which is in the form of a cube corner, and where a number of holographic diffraction devices is associated with a different portion of the array.

A third embodiment of the optical retro-reflection device is shown in FIG. 3. This embodiment is similar to the embodiment of FIG. 1, and accordingly similar parts have been accorded the same reference numerals. However, the retro-reflector 10 now comprises an array of micro-prisms each of which is in the form of a cube corner. Alternatively, the retro-reflector 10 can comprise an array of micro-spheres. In either configuration, a single stack 11 of the holographic diffraction devices overlays the whole of the retro-reflector 10.

In a fourth embodiment of the optical retro-reflection device (shown in FIG. 4), the retro-reflector 10 again comprises an array of micro-prisms or micro-spheres. However, a plurality of stacks 11a–d of holographic diffraction devices are now provided, each of which overlays a respective area of the retro-reflector 10. As with the embodiment of FIG. 2, the individual "red" devices 12a–d in the various stacks can be activated in unison by the control circuit 15, such that red wavelengths are retro-reflected over the whole of the overall device at the same time, and similarly with the individual "green" devices 13a–d and "blue" devices 14a–d. Alternatively, the control circuit 15 can activate these devices in different combinations such that, at any given time, a first part of the overall device retro-reflects red wavelengths, a second part retro-reflects green wavelengths and a third part retro-reflects blue wavelengths.

In the foregoing embodiments, the retro-reflector 10 has been described as a cube corner prism, orthogonally arranged plane reflectors, an array of micro-prisms and an array of micro-spheres. However, the retro-reflector 10 can take any convenient form and can alternatively comprise any other type of retro-reflective optical element or screen material.

Figure 5:
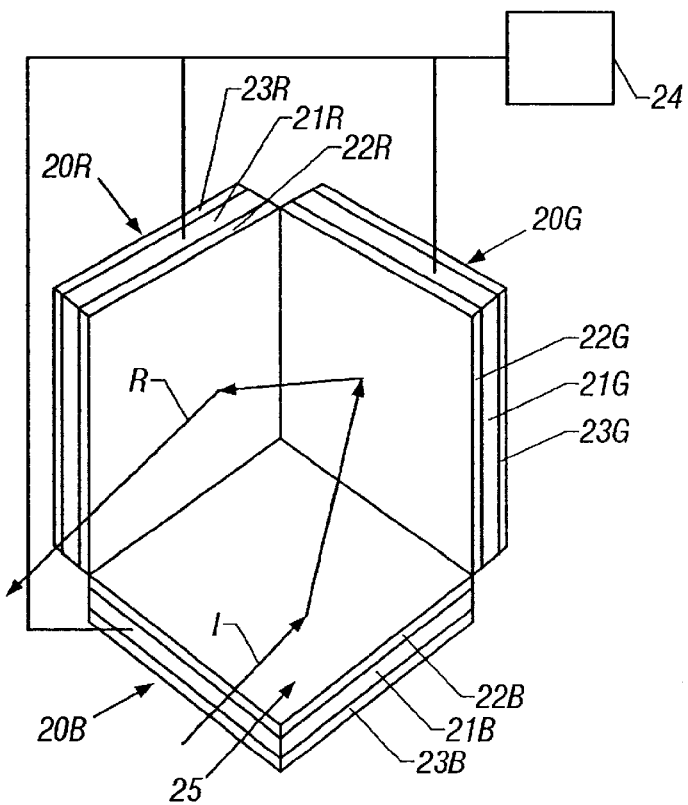
FIG. 5 is a schematic perspective view of a fifth embodiment of an optical retro-reflection device according to the present invention where, the holographic diffraction devices are each composed of a reflection hologram, and the retro-reflector is configured as three orthogonally-arranged reflection devices each of which is composed of a filter and one of the holographic diffraction devices.

A fifth embodiment of the invention is shown in FIG. 5, in which the overall retro-reflection device is generally in the form of three orthogonally-arranged reflection devices 20R, 20G and 20B which form a cube corner. The device 20R is composed of a holographic diffraction device 21R and a filter 22R that is disposed on a front surface of the diffraction device, with respect to the direction of light incidence. The holographic diffraction device 21R comprises essentially a reflection hologram that is designed to reflect diffractively light of a pre-determined wavelength band in the red region of be visible spectrum. The filter 22R takes the form of a dichroic interference filter which is operative to transmit wavelengths corresponding to (or falling within) the bandwidth acted upon by the device 21R. A dichroic interference filter is one that reflects one or more optical bands or wavelengths and transmits others, while maintaining a nearly zero coefficient of absorption for all wavelengths of interest. A dichroic filter may be high-pass, low-pass, band-pass, or band rejection. In this application, it would preferably be a band-pass. A light-absorbing element 23R is disposed on the opposite surface of the device 21R.

The reflection device 20G similarly comprises a holographic diffraction device 21G, a dichroic filter 22G and a light-absorbing element 23G, while the reflection device 20B is composed of a holographic diffraction device 21B, a dichroic filter 22B and a light-absorbing element 23B. However, the device 21G (which is again in the form of a reflection-type hologram) and the filter 22G are designed to act only on green wavelengths, whereas the device 21B (also in the form of a reflection-type hologram) and the filter 22B are designed to act only on blue wavelengths.

As in the previous embodiment, the holographic diffraction devices 21R, 21G and 21B are switchable under the action of a control circuit 24 between an active, diffracting state and an inactive, non-diffracting state. Switching between states is performed by applying an electric field to the diffraction devices by way of electrodes (not shown), which serves effectively to erase the respective hologram so long as the electric field is maintained. Moreover, the control circuit 24 operates such that, when any one of the devices 21R, 21G and 21B is activated, the other two devices are de-activated. In each case, the holographic diffraction device takes essentially the same form as that described for the pervious embodiment except that the holograms are now reflective rather than transmissive.

The operation of the device shown in FIG. 5 will now be described in detail. It will be manifest that light incident upon a front aperture 25 of the overall device (in a direction which satisfies the geometrical conditions for retro-reflection, as indicated by arrow n), will be reflected by all three of the reflection devices 20R, 20G and 20B before emerging in the direction of arrow R, parallel to its original direction of incidence. Moreover, whenever a given one of the holographic diffraction devices 21R, 21G and 21B is activated, the light will encounter the respective reflection device 20R, 20G or 20B at either its first, second or third reflection. For the purpose of the ensuing description, it will be assumed that the holographic diffraction device 21B is activated, but it is understood that the device will operate in an exactly analogous matter when either of the holographic diffraction devices 21G or 21B is activated instead.

In the first instance, consideration will be given to the situation where light incident upon the overall device encounters the reflection devices in the order 20R, 20G and then 20B. When white light is initially incident upon the device 20R, the red wavelength component thereof will be transmitted by the filter 22R while the green and blue wavelength components will be reflected by the filter. The red component will then pass on to the holographic diffraction device 21R, which is de-activated so long as 21B is activated. As a consequence, the diffracted red component passes straight through the device 21R and is absorbed by the element 23R.

When the above-mentioned green and blue components are incident upon the reflection device 20G, the green component is transmitted by the filter 22G while the blue component is reflected by the filter. The green component then passes on to the holographic diffraction device 21G, but because the latter is de-activated the green component passes straight through and is then absorbed by the element 23G.

When the blue light component is incident upon the reflection device 20B, it is transmitted through the filter 22B and is incident upon the holographic diffraction device 21B. Because the device 21B is activated at this time, the blue light is diffractively reflected by the latter and passes again through the filter 22B, and thereafter is emitted from the overall device in the direction of the arrow R. Thus, although white light is initially incident upon the overall device, only blue wavelengths are re-emitted.

In the situation where the light is incident upon the reflection device 20G before the device 20B, the operation is analogous to that described above, but with the red and blue components being reflected by the device 20G and the blue component alone being subsequently reflected by the device 20R.

The situation will now be considered where the light encounters the reflection device 20B at its second reflection. When, for example, white light is incident in the first instance upon the reflection device 20R, the red component will be absorbed and the green and blue components will be transmitted in exactly the same manner as before. However, when the green and blue components are now incident upon the reflection device 20B, filter 22B reflects the green component while the blue component passes there through and on to the holographic diffraction device 21B. Because 21B is activated at this time, the blue component is diffractively reflected thereby and passes again through the filter 22B, to emerge in the same direction as the green light reflected by the latter. As a consequence, both the green and blue components are reflected by device 20B.

When the green and blue components subsequently impinge upon the reflection device 24G, the filter 22G reflects the blue component while the green component passes there through and on to the holographic diffraction device 21G. Because this device is deactivated at this time, the green component passes through this also and is absorbed by the element 23G. As a result, only the blue component of the light is re-emitted by the overall device.

In the case where the light is incident upon the reflection device 20G first and the reflection device 20R last, the operation is analogous to that described above except that red and blue wavelengths are reflected by the device 20G and again by the device 20B, with the red wavelengths subsequently being absorbed by the device 20R.

Finally, consideration will be given to the situation where the light is incident upon the reflection device 20B at its first reflection. In this case, the red and green wavelengths are reflected by the filter 22B while the blue wavelengths pass there through and on to the holographic diffraction device 21B. Because this device is activated, the blue wavelengths are then diffractively reflected thereby and pass back through the filter 22B to emerge in the same direction as the red and green wavelengths. As a consequence, all three of the red, green and blue components are reflected by the device 20B.

In the case where the reflected light encounters the other two reflection devices in the order 20R, 20G the red component is absorbed by the device. 20R and the blue and green components are reflected thereby. Subsequently to this, device 20G absorbs the green component while the blue component is reflected. In the case where these reflection devices are encountered in the order 20G, 20R the green component is absorbed by the device 20G and the red and blue components are reflected thereby. Subsequent to this, device 20R absorbs the red component while the blue component is reflected thereby. In either case, only blue wavelengths are re-emitted after retro-reflection by the overall device.

From the foregoing description, it will be manifest that the overall device is operative to retro-reflect only blue wavelengths when the holographic diffraction device 21B is activated. Similarly, the overall device will be operative to retro-reflect only red or green light when the holographic diffraction devices 21R and 21G are respectively activated.

As mentioned above, the holographic diffraction devices 21R, 21B and 21G are each essentially in the form of a reflection-type hologram. It is well known that such holograms have a relatively narrow bandpass (typically a few tens of nanometers), whereas transmission-type holograms have a much broader bandpass (usually in the region of 100 to 156 nanometers).

To provide a broader band-pass pass-band for reflective-type holographic diffraction devices 21R, 21B and 21G, it is possible to construct each of these from a stack of holographic diffraction elements having respective different bandpass characteristics. Each of these elements acts essentially as a narrow bandpass filter, and the overall bandpass characteristics of the stack will be the additive combination of the individual bandpasses of the separate elements. In this case, it is preferred that all of the elements in each stack are switchable by means of a common pair of electrodes. If a separate pair of electrodes were employed for each of the holographic diffraction elements, this would introduce significant transmission losses.

Figure 6:
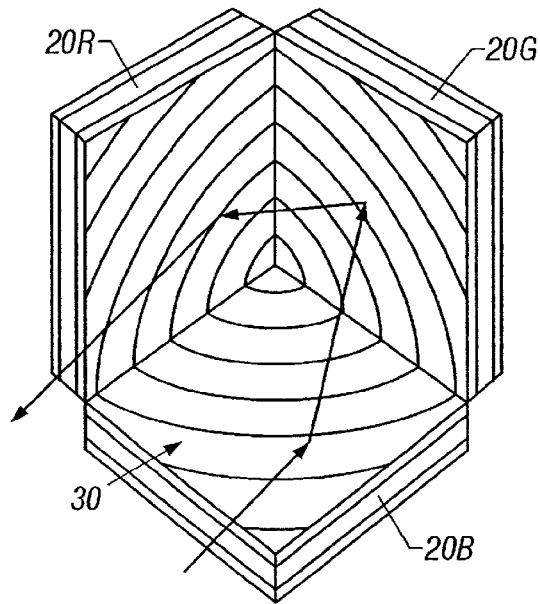
FIGS. 6 and 7 are similar views to FIG. 5 but showing modified arrangements employing a Fresnel lens or a Fresnel prism.
Figure 7:
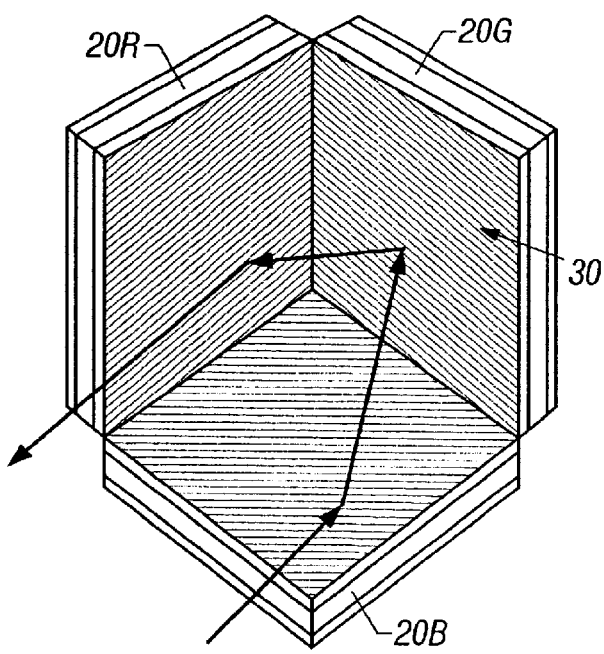
Figure 8:
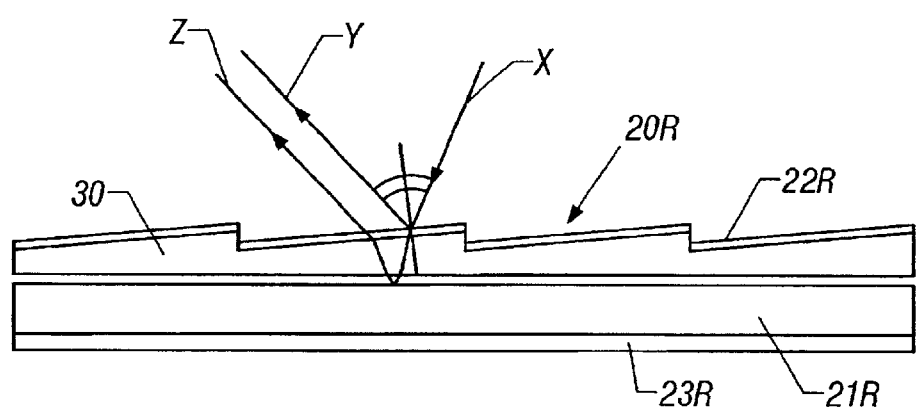
FIG. 8 is a cross-sectional illustration of the devices shown in FIGS. 6 and 7.

In the embodiment of FIG. 5, the reflection devices 20R, 20G and 20B have been described as being orthogonally arranged. However, it is also possible to achieve retro-reflection in situations where one or more of these devices deviate from the orthogonal, as indicated in FIGS. 6 and 7. In this case, the affected device(s) are provided with a Fresnel lens or Fresnel prism (designated generally as 30) to compensate for its aforesaid deviation. In the arrangement shown in FIG. 6, the Fresnel lens is of generally circular or curved form, whereas in FIG. 7 it is of a linear form. A detailed illustration of the Fresnel lens arrangement is shown in FIG. 8 for the reflection device 20R, but its application to the devices 20G and/or 20B will be the same. More particularly, the Fresnel lens 30 underlies the filter 22R, which is provided as a coating on a front surface of the lens 30. Green or blue wavelengths that are incident upon the device 20R (as indicated by arrow X) will be reflected by the filter 22R in the direction of arrow Y. By the laws of simple geometric optics, the angle of incidence will equal the angle of reflection. On the other hand, red wavelengths that impinge upon the device 20R in the direction of arrow X will be transmitted through the filter 22R and will then pass onto the holographic diffraction device 21R after refraction by the Fresnel lens 30. In the case where the device 21R is de-activated, the red wavelengths will simply be absorbed by the element 23R. In the case where the device 21R is activated, the red wavelengths will be diffractively reflected back to the Fresnel lens, refracted once again by the lens, and then transmitted back through the filter 22R to emerge (as indicated by arrow Z) in the same direction as the reflected green and blue wavelengths. The optical retro-reflection devices described above in relation to FIGS. 1, 2 and 5 through 7 are based on retro-reflectors that essentially comprise cube corners. Using such an arrangement, it is possible to achieve a variety of configurations for the front aperture (16, FIG. 1) (25, FIG. 5) including circular, rectangular, square or triangular forms. The optimum geometry will be based on consideration of the required effective aperture, which is determined by the desired variation of retro-reflection efficiency with angle. Typically, the size of the front aperture (16, FIG. 1) (25, FIG. 5) will range from a few millimeters to several inches.

In the foregoing descriptions, it has been assumed that a patch of light is incident upon the overall device in such a direction that it is aimed at the corner point between the orthogonal reflectors. Because of the nature of the light source, some of the light will always be contained within the range of incidence angles required for retro-reflection. However, it is possible to augment the above-described constructions with additional optical elements (such as lenticular lens arrays) in order to increase the range of incidence angles over which light will be retro-reflected.

The optical retro-reflection devices described above have many and varied applications. Reference has already been made to the device of FIG. 2 finding a particular application in reconfigurable displays, such as road information signs. However, it is possible to use the devices in many other areas, such as (for example) in robotics or in laser instrumentation. In addition, it is possible to use the device for signaling purposes by varying the electric field applied to one or more of the holograms in order to modulate toe retro-reflected light.

Whereas the invention has been described in relation to what are presently considered to be the most practical and preferred embodiments, it is to be understood that the invention is not limited to the disclosed arrangements but rather is intended to cover various modifications and equivalent constructions included within the spirit and scope of the invention. For example, it is possible to arrange for the holographic diffraction devices to operate with wavelengths other than those of red, green and blue light, and indeed more or less than three such devices can be provided. Also, instead of being activated individually, it is possible to arrange for the holographic diffraction devices to be activated in selected combinations. For example, by activating the "red" and "green" devices together, the overall device can be used to retro-reflect yellow light. It is also possible to use as the incident light a combination of separate monochromatic light sources (e.g. LED's or lasers) instead of a single white light source.

What is claimed is:

1. An optical retro-reflection apparatus comprising:
   a retro-reflector operative to receive radiation incident thereon and to reflect and/or re-emit the received radiation from said device in a direction parallel to its direction of incidence;
   one or more holographic diffraction elements, each having one or more holographic devices, each of the devices operative to diffract a predetermined wavelength band of radiation incident on said apparatus and switchable between an active, diffracting state and an inactive, non-diffracting state;
   a control circuit couple to each of the devices of each of said one or more diffraction elements, said control circuit operative to switch said holographic devices between their active and inactive states; and
   wherein the radiation reflected or re-emitted by said retro-reflector is the radiation diffracted by said diffraction device.

2. The optical retro-reflection apparatus of claim 1 wherein the one or more holographic layers comprises a holographic recording medium that records a hologram, wherein the holographic recording medium comprises:
   a monomer dipentaerythritol hydroxypentaacrylate;
   a liquid crystal;
   a cross-linking monomer;
   a coinitiator; and
   a photoinitiator dye.

3. The optical retro-reflection apparatus of claim 1 wherein the one or more holographic devices comprises a hologram made by exposing an interference pattern inside a polymer-dispersed liquid crystal material, the polymer-dispersed liquid crystal material comprising, before exposure:
   (a) a polymerizable monomer;
   (b) a liquid crystal;
   (c) a cross-linking monomer;
   (d) a coinitiator; and
   (e) a photoinitiator dye.

4. The optical retro-reflection apparatus of claim 1 wherein said one or more holographic diffraction elements are disposed between a source of radiation and the retro-reflector, and is operating in the transmissive-type mode.

5. The optical retro-reflection apparatus of claim 1 wherein said one or more holographic diffraction elements comprise at least three of the holographic devices, each of said holographic devices operative to diffract a different wavelength band of the source radiation incident thereon.

6. The optical retro-reflection apparatus of claim 5 wherein said at least three holographic devices are operative to diffract red, green and blue visible light, respectively.

7. The optical retro-reflection apparatus of claim 5 wherein said retro-reflector is a cube corner prism.

8. The optical retro-reflection apparatus of claim 5 wherein said retro-reflector is three orthogonally arranged plane reflectors.

9. The optical retro-reflection apparatus of claim 5 wherein said retro-reflector comprises a plurality of three orthogonally arranged reflectors organized into an array.

10. The optical retro-reflection apparatus of claim 5 wherein said retro-reflector comprises a plurality of cube corner prisms organized into an array.

11. The optical retro-reflection apparatus of claim 9 wherein each of the three orthogonally arranged reflectors of the array is associated with its own holographic diffraction element.

12. The optical retro-reflection apparatus of claim 9 wherein two or more of the three orthogonally arranged reflectors of the array are associated with one holographic diffraction element.

13. The optical retro-reflection apparatus of claim 10 wherein each of the cube corner prisms of the array is associated with its own holographic diffraction element.

14. The optical retro-reflection apparatus of claim 10 wherein two or more of the cube corner prisms of the array are associated with one holographic diffraction element.

15. The optical retro-reflection apparatus of claim 5 wherein said retro-reflector comprises a plurality of Microspheres organized into an array.

16. The optical retro-reflection apparatus of claim 5 wherein said retro-reflector comprises an array of microprisms each of which is in the form of a cube corner.

17. The optical retro-reflection apparatus of claim 1 comprises three of said retro-reflectors arranged substantially orthogonal to one another, each of said retro-reflectors further comprising:
- one of the one or more holographic diffraction elements;
- an interference pass-band filter coupled between said holographic diffraction element and any radiation incident upon said apparatus, said filter operative to pass only those wavelength bands that the one or more devices of said holographic diffraction elements is operative to diffract while in the active state; and
- a light absorbing element coupled to a surface of said holographic diffraction element opposite to that which is coupled to said filter.

18. The optical retro-reflection apparatus of claim 17 wherein said one or more holographic devices of said diffraction elements for each of said three retro-reflectors are reflective-type and reflect only those wavelength bands of incident radiation for which their respective holographic devices are operative to diffract when in the active state.

19. The optical retro-reflection apparatus of claim 18 wherein said one or more holographic devices of each of said diffraction elements are controlled using a common electrode, and thus are active at the same time, thereby combining their respective pass-bands to provide an expanded optical bandwidth.

20. The optical retro-reflection apparatus of claim 18 wherein each of said diffraction devices of the three retro-reflectors are operative to diffract red, green and blue wavelength bands respectively.

21. The optical retro-reflection apparatus of claim 18 wherein only one of said diffraction elements of the three retro-reflectors is active at any given time.

22. The optical retro-reflection apparatus of claim 18 wherein said three retro-reflectors are not substantially orthogonal, said apparatus further comprising a Fresnel prism or lens underlying said filter by which to compensate for the lack of orthogonality.

23. The optical retro-reflection apparatus of claim 18 wherein said interference filter is a dichroic filter.

* * * * *